(12) United States Patent (10) Patent No.: US 9,164,220 B2
Hunt et al. (45) Date of Patent: Oct. 20, 2015

(54) UNIFORM LIGHT DIRECTING FILM AND METHOD OF MAKING SAME

(75) Inventors: Bryan V. Hunt, Nowthen, MN (US); Robert M. Emmons, Saint Paul, MN (US); Corey D. Balts, Eau Claire, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 297 days.

(21) Appl. No.: 13/813,572

(22) PCT Filed: Aug. 1, 2011

(86) PCT No.: PCT/US2011/046082
§ 371 (c)(1),
(2), (4) Date: Mar. 13, 2013

(87) PCT Pub. No.: WO2012/018707
PCT Pub. Date: Feb. 9, 2012

(65) Prior Publication Data
US 2013/0163256 A1 Jun. 27, 2013

Related U.S. Application Data

(60) Provisional application No. 61/369,926, filed on Aug. 2, 2010.

(51) Int. Cl.
*G02B 5/04* (2006.01)
*F21V 8/00* (2006.01)
(52) U.S. Cl.
CPC ............ *G02B 6/0053* (2013.01); *G02B 5/045* (2013.01); *G02B 6/0001* (2013.01)

(58) Field of Classification Search
CPC .. G02B 5/0221; G02B 5/0231; G02B 5/0278; G02B 5/045; G02B 6/0001; G02B 6/0053; G02F 1/133504; Y10T 428/24355
See application file for complete search history.

(56) References Cited

U.S. PATENT DOCUMENTS

| 3,860,814 A * | 1/1975 | Klang et al. ............. 250/227.11 |
| 7,404,659 B2 | 7/2008 | Mai |
| 7,950,838 B2 | 5/2011 | Johnson |
| 2004/0125592 A1 | 7/2004 | Nagakubo et al. |
| 2006/0055627 A1 | 3/2006 | Wilson |
| 2007/0058259 A1 | 3/2007 | Hwang et al. |

FOREIGN PATENT DOCUMENTS

WO WO 2009/124107 A1 10/2009

* cited by examiner

*Primary Examiner* — Stephen F Husar
(74) *Attorney, Agent, or Firm* — Clifton F. Richardson

(57) ABSTRACT

Light directing film (100) is disclosed. The light directing film includes a structured major surface (110) that includes a plurality of microstructures (150) extending along a first direction (142) and a plurality of elevated portions (160) disposed on the plurality of microstructures. The number density of the elevated portions across the light directing film is D. Each elevated portion includes a leading edge (162) and a trailing edge (164) along the first direction. The light directing film can be divided into a plurality of same size and shape grid cells that form a continuous two-dimensional grid. The area of each grid cell is approximately 1/D. Each of at least 70% of the grid cells includes a single leading edge (162) of an elevated portion (160).

19 Claims, 12 Drawing Sheets

UNIFORM LIGHT DIRECTING FILM AND METHOD OF MAKING SAME

FIELD OF THE INVENTION

This invention generally relates to light directing films that have a substantially uniform appearance, methods of making such light directing films, and displays incorporating such films.

BACKGROUND

Flat panel displays, such as displays that incorporate a liquid crystal panel, often incorporate one or more light directing films to enhance display brightness along a predetermined viewing direction. Such light directing films typically include a plurality of linear microstructures that have prismatic cross-sectional profiles.

In some applications a single prismatic film is used, while in others two crossed prismatic films are employed, in which case, the two crossed prismatic films are often oriented perpendicular to each other.

SUMMARY OF THE INVENTION

Generally, the present invention is related to light directing films. In one embodiment, a light directing film includes a structured major surface that includes a plurality of microstructures extending along a first direction. Each microstructure includes a plurality of elevated portions and a plurality of non-elevated portions. The elevated portions of the plurality of microstructures have an average length. Each elevated portion includes a leading edge and a trailing edge along the first direction. The light directing film can be divided into a plurality of same size and shape grid cells that form a continuous two-dimensional grid. Each of at least 70%, or at least 80%, or at least 90%, or at least 95%, or at least 98%, of the grid cells include either a single leading edge of an elevated portion, or a portion of an elevated portion where the elevated portion has a length that is greater than the average length of the elevated portions. In some cases, each grid cell includes either a single leading edge of an elevated portion, or a portion of an elevated portion where the elevated portion has a length that is greater than the average length of the elevated portions. In some cases, at least some of the microstructures have prismatic cross-sectional profiles, or curvilinear cross-sectional profiles, or rectilinear cross-sectional profiles. In some cases, the non-elevated portions of each microstructure have a same constant peak height along the first direction. In some cases, the non-elevated portions of the microstructures in the plurality of microstructures have a same constant peak height along the first direction. In some cases, elevated portions of the microstructures in the plurality of microstructures have a same maximum peak height. In some cases, a first elevated portion has a first maximum peak height and a second elevated portion has a second maximum peak height different than the first maximum peak height. In some cases, the grid cells are rectangular, or square. In some cases, each grid cell includes only one microstructure peak. In some cases, each grid cell includes peaks of at least two adjacent microstructures, or peaks of at least three adjacent microstructures. In some cases, the lateral cross-section of a microstructure in a region of an elevated portion and in a region of a non-elevated portion have the same shape. In some cases, each of at least 50%, or at least 70%, or at least 90%, of the grid cells includes a single leading edge of an elevated portion. In some cases, each of less than about 20%, or less than about 10%, or less than about 5%, of the grid cells does not include a leading edge of an elevated portion and includes a portion of an elevated portion where the elevated portion has a length that is greater than the average length of the elevated portions. In some cases, at least 50%, or at least 70%, or at least 90%, of the elevated portions have substantially a same length, where, in some cases, the remaining elevated portions have longer lengths. In some cases, the elevated portions of each microstructure cover at least about 1.5%, or about 3%, or about 5%, or about 10%, of the microstructure along the first direction.

In another embodiment, a light directing film includes a structured major surface that includes a plurality of microstructures extending along a first direction and a plurality of elevated portions disposed on the plurality of microstructures. The number density of the elevated portions across the light directing film is D. Each elevated portion includes a leading edge and a trailing edge along the first direction. The light directing film can be divided into a plurality of same size and shape grid cells that form a continuous two-dimensional grid. The area of each grid cell is approximately 1/D. Each of at least 70%, or at least 80%, or at least 90%, or at least 95%, of the grid cells includes a single leading edge of an elevated portion.

In another embodiment, a light directing film includes a structured major surface that includes a plurality of microstructures extending along a first direction. Each microstructure includes a plurality of elevated portions and a plurality of non-elevated portions. The lateral cross-section of a microstructure in a region of an elevated portion and in a region of a non-elevated portion have the same shape. The diameter of the largest circle that can be overlaid on the structured major surface of the light directing film without including at least a portion of an elevated portion is not greater than about 0.5 mm, or about 45 mm, or about 4 mm, or about 0.35 mm. In some cases, at least some of the non-elevated portions have constant heights.

In another embodiment, a light directing film includes a structured major surface that includes a plurality of microstructures extending along a first direction. Each microstructure includes a plurality of elevated portions and a plurality of non-elevated portions. The elevated portions of the plurality of microstructures have an average length. Each elevated portion includes a leading edge and a trailing edge along the first direction. The light directing film can be divided into a plurality of same size and shape grid cells forming a continuous two-dimensional grid. Each grid cell includes peaks of at least two neighboring microstructures. Each of at least 70% of the grid cells includes either a single leading edge of an elevated portion, or a portion of an elevated portion where the elevated portion has a length that is greater than the average length of the elevated portions.

In one embodiment, a method of distributing a plurality of protrusions on a light directing film includes the steps of: (a) providing a light directing film that includes a plurality of microstructures extending along a first direction, where each microstructure includes a peak extending along the first direction; (b) overlaying a continuous grid on the light directing film, where the grid includes a plurality of same size and shape grid cells, such that each grid cell includes the same number of microstructure peaks; (c) dividing each grid cell into a same number of sub-cells such that each sub-cell includes a single microstructure peak; (d) choosing a single sub-cell in each grid cell; and (e) placing a leading edge of a protrusion in each randomly chosen sub-cell. In some cases, each protrusion includes a trailing edge opposite the leading edge of the protrusion, wherein carrying out step (e) results in the leading edges of the protrusions being on the same side of the protrusions and the trailing edges of the protrusions being on the opposite side of the protrusions. In some cases, step (d) includes randomly choosing a single sub-cell in each grid cell. In some cases, steps (a) through (e) are carried out sequentially.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

The present invention generally relates to light directing films that have a uniform appearance and when incorporated into a display such as a liquid crystal display, result in bright and uniform displayed images. The disclosed light directing films include a plurality of elevated portions disposed on the peaks of a plurality of linear microstructures where the elevated portions limit any optical coupling between a light directing film and a neighboring film or layer primarily to the elevated portions. The elevated portions are distributed across the light directing film in a manner that results in the light directing film, and a display that incorporates the light directing film, having a uniform appearance.

Figure 1:
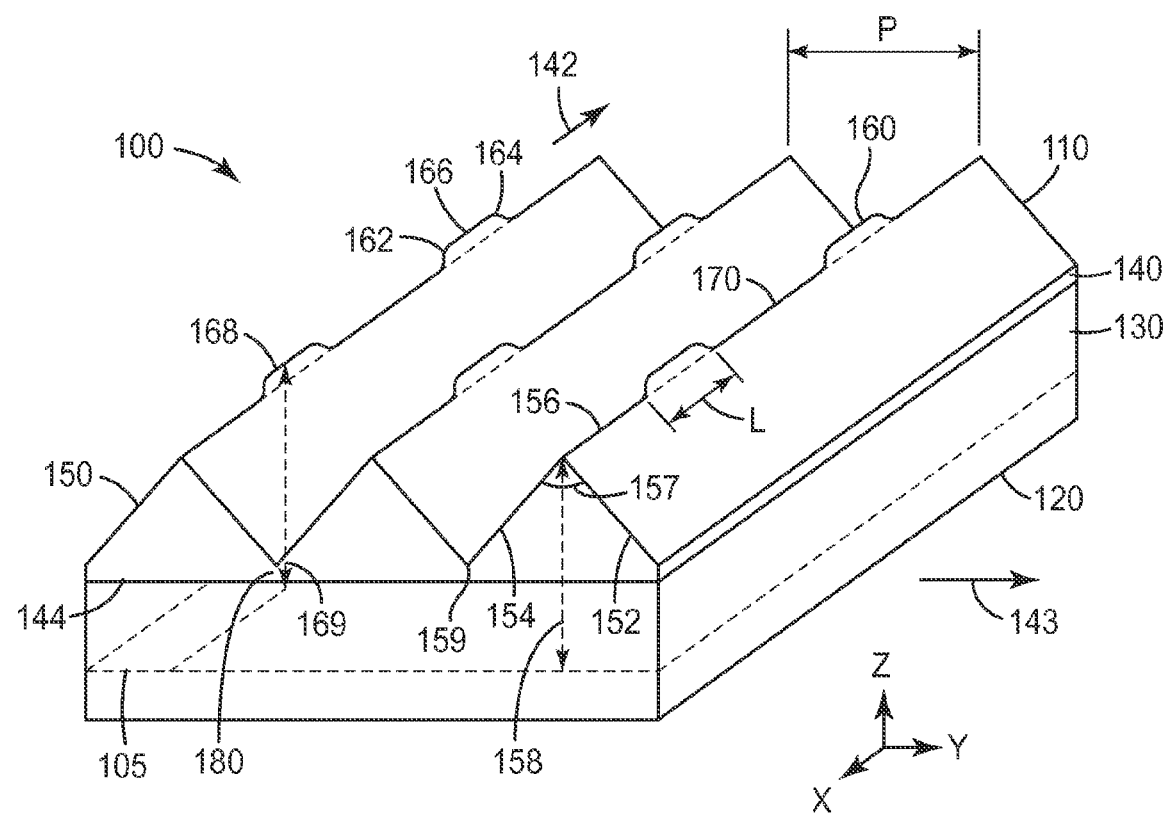
FIG. 1 is a schematic three-dimensional view of a light directing film.
Figure 2:
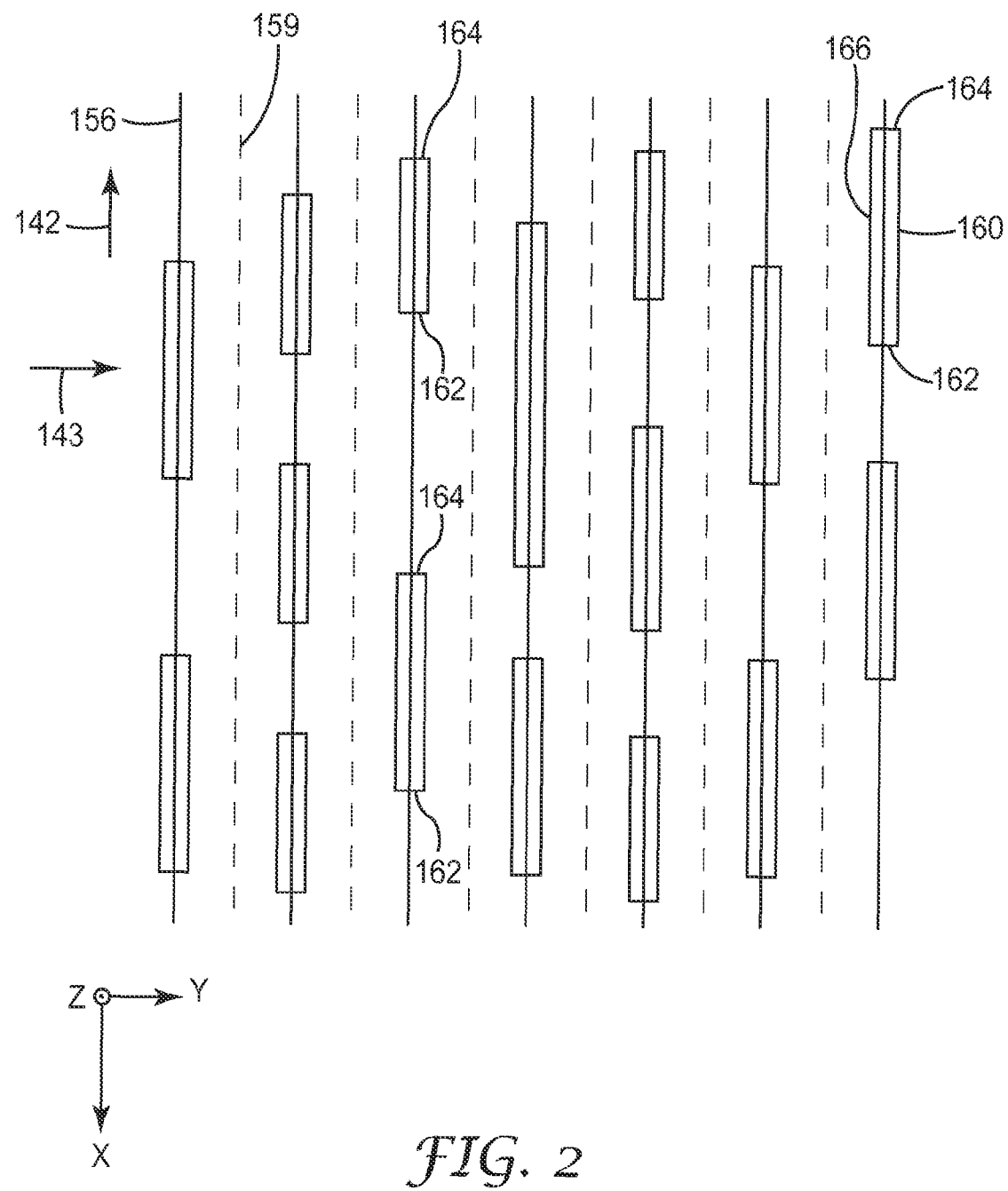
FIG. 2 is a top view of a light directing film.

FIGS. 1 and 2 are schematic three-dimensional and top views of a light directing film 100, respectively. The light directing film generally lies in the xy-plane and includes a first structured major surface 110 and an opposing second major surface 120. First structured major surface 110 includes a plurality of microstructures 150 that extend along a first direction 142 that, in the exemplary light directing film 100, is parallel to the x-axis. Light directing film 100 includes a structured layer 140 disposed on a substrate 130, where structured layer 140 includes first structured major surface 110 and substrate 130 includes second major surface 120. The exemplary light directing film 100 includes two layers. In general, the disclosed light directing films can include one or more layers.

Each microstructure 150 includes a plurality of elevated portions 160 and a plurality of non-elevated portions 170. In general, each microstructure 150 includes alternating elevated and non-elevated portions. Elevated portions 160 substantially prevent optical coupling between non-elevated portions 170 and an adjacent layer that is placed on and comes into optical or physical contact with light directing film 100. Elevated portions 160 confine any optical coupling predominately to the elevated portions. Elevated portions 160 can be considered to be portions disposed on peaks 156 of microstructures 150. In general, the density, such as the number, line, or area density of elevated portions 160 is sufficiently low so that optical coupling at the elevated portions does not significantly reduce the optical gain of the light directing film, and sufficiently high so as to confine optical coupling to the elevated portions or regions of the light directing film. In some cases, the density of elevated portions 160 along peak 156 of a microstructure is not greater than about 30%, or not greater than about 25%, or not greater than about 20%. In some cases, the density of elevated portions 160 along peak 156 of a microstructure is not less than about 5%, or not less than about 10%, or not less than about 15%. In some cases, the number density of elevated portions 160 per unit area is not greater than about 10,000 per $cm^2$, or not greater than about 9,000 per $cm^2$, or not greater than about 8,000 per $cm^2$, or not greater than about 7,000 per $cm^2$, or not greater than about 6,000 per $cm^2$, or not greater than about 5,000 per $cm^2$, or not greater than about 4,500 per $cm^2$, or not greater than about 4,000 per $cm^2$, or not greater than about 3,500 per $cm^2$, or not greater than about 3,000 per $cm^2$, or not greater than about 2,500 per $cm^2$. In some cases, the number density of elevated portions 160 per unit area is not less than about 500 per $cm^2$, or not less than about 750 per $cm^2$, or not less than about 1,000 per $cm^2$, or not less than about 1,250 per $cm^2$, or not less than about 1,500 per $cm^2$, or not less than about 1,750 per $cm^2$, or not less than about 2,000 per $cm^2$. In some cases, the elevated portions of each microstructure cover at least about 1%, or at least 1.5%, or at least 3%, or at least 5%, or at least 7%, or at least 10%, or at least 13%, or at least 15%, of the microstructure along the first direction.

Each elevated portion 160 includes a length L along first direction 142 where, in general, different elevated portions can have different lengths. In general, elevated portions 160 have an average length that can be in a range from about 10 microns to about 500 microns, or from about 25 microns to about 450 microns, or from about 50 microns to about 450 microns, or from about 50 microns to about 400 microns, or from about 75 microns to about 400 microns, or from about 75 microns to about 350 microns, or from about 100 microns to about 300 microns.

Each elevated portion 160 includes a leading edge 162 along first direction 142, a trailing edge 164 along the first direction, and a main portion 166 between and connecting the leading edge and the trailing edge. Leading edges 162 are on the same side or end of the elevated portions and trailing edges 164 are on the opposite side or end of the elevated portions. Stated in a different way, when travelling along the peak of a microstructure, the leading edge of an elevated portion is encountered first, then the main portion of the elevated portion, followed by the trailing edge of the elevated portion.

Figure 3:
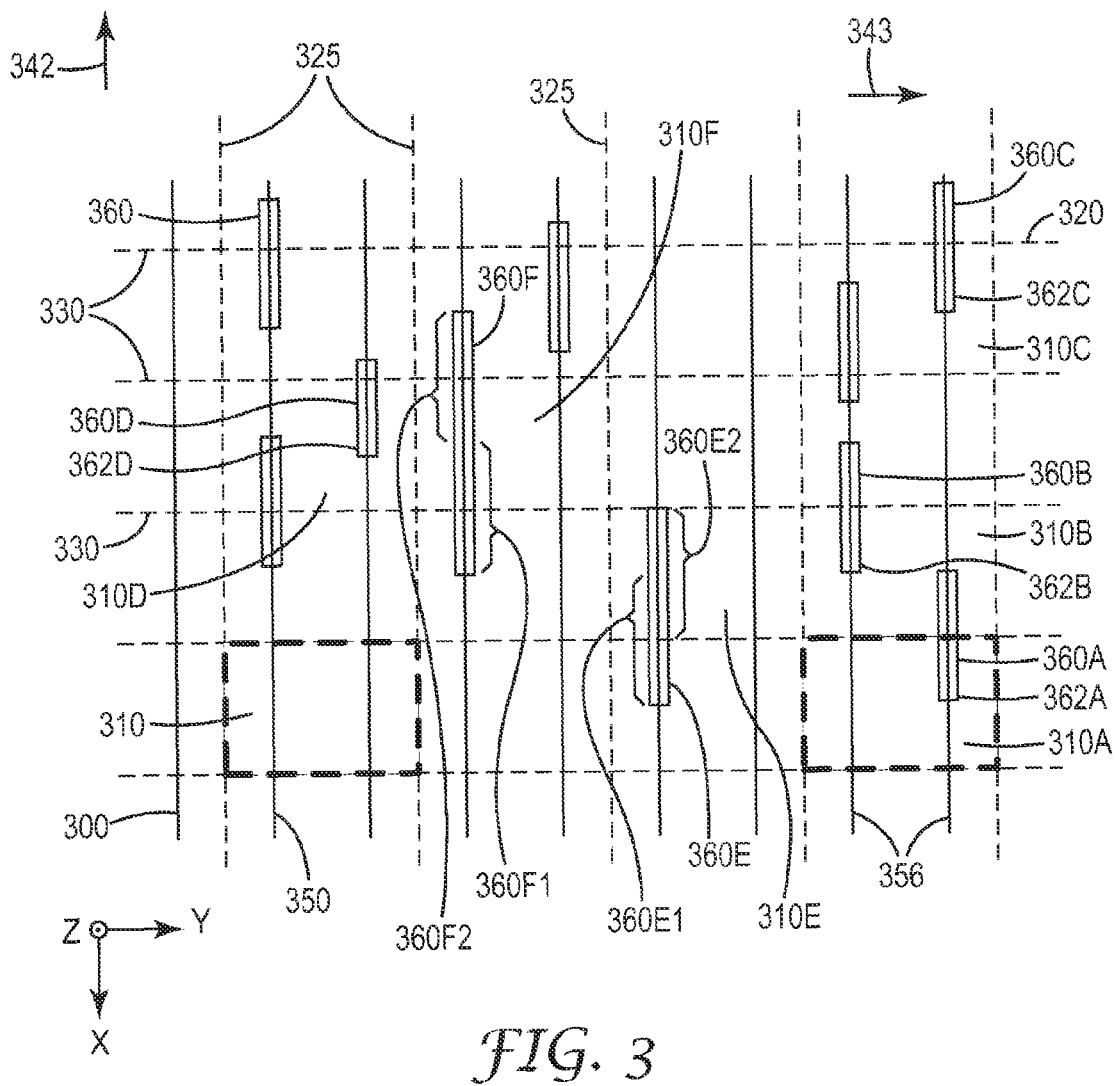
FIG. 3 is a top view of a grid overlaid on a light directing film.

The disclosed light directing films can be divided into a plurality of same size and shape grid cells that form a continuous uniform two-dimensional grid, where each of at least 70%, or at least 75%, or at least 80%, or at least 85%, or at least 90%, or at least 95%, or at least 98%, or at least 99%, of the grid cells includes either (a) a single leading edge of an elevated portion, or (b) a portion of an elevated portion, where the elevated portion has a length that is greater than the average length of the elevated portions. In some cases, each grid cell includes either (a) a single leading edge of an elevated portion, or (b) a portion of an elevated portion, where the elevated portion has a length that is greater than the average length of the elevated portions. For example, FIG. 3 is a top-view of a light directing film 300, similar to light directing film 100, that includes a plurality of microstructures 350 that extend along a first direction 342 along the x-direction. Each microstructure 350 includes a peak 356 along the first direction and a plurality of elevated portions 360. Light directing film 300 can be divided into a plurality of same size and shape grid cells 310 that form a continuous uniform two-dimensional grid 320. Each of at least 70%, or at least 75%, or at least 80%, or at least 85%, or at least 90%, or at least 95%, or at least 98%, or at least 99%, of grid cells 310 includes either (a) a single leading edge of an elevated portion, or (b) a portion of an elevated portion, where the elevated portion has a length that is greater than the average length of the elevated portions. In some cases, each grid cell 310 includes either (a) a single leading edge of an elevated portion, or (b) a portion of an elevated portion, where the elevated portion has a length that is greater than the average length of the elevated portions. For example, grid cell 310A includes a single leading edge which is leading edge 362A of elevated portion 360A, grid cell 310B includes a single leading edge which is leading edge 362B of elevated portion 360B, and grid cell 310C includes a single leading edge which is leading edge 362C of elevated portion 360C. As another example, grid cell 310E does not include a visible or readily identifiable leading edge of an elevated portion, but it does include a portion of elevated portion 360E which, in the exemplary light directing film 300, is the overlap between elevated portion 360E1 and elevated portion 360E2, and where the length of elevated portion 360E is greater than the average length of the elevated portions. As another example, grid cell 310F does not include a visible or readily identifiable leading edge of an elevated portion, but it does include a portion of elevated portion 360F which, in the exemplary light directing film 300, is the overlap between elevated portion 360F1 and elevated portion 360F2, and where the length of elevated portion 360F is greater than the average length of the elevated portions.

At least a majority of the elevated portions in the light directing films disclosed herein have substantially the same length. For example, in such cases, at least 50%, or at least 60%, or at least 70%, or at least 80%, or at least 85%, or at least 90%, or at least 95% of the elevated portions have substantially the same length, meaning that the differences in the lengths of the elevated portion that have substantially the same lengths is less than about 30%, or less than about 25%, or less than about 20%, or less than about 15%, or less than about 10%. In some cases, a small fraction of the elevated portions are longer than the average length of the elevated portions. For example, less than about 40%, or less than about 30%, or less than about 25%, or less than about 20%, or less than about 15%, or less than about 10%, or less than about 5%, of the elevated portions are longer than the average length of the elevated portions. In some cases, the longer elevated portions result from the overlap of multiple, such as two or more, or three or more, or four or more, elevated portions. In some cases, the longer elevated portions result from the overlap of two, three, or four elevated portions.

In some cases, at least 50%, or at least 60%, or at least 70%, or at least 80%, or at least 85%, or at least 90%, or at least 95% of the elevated portions have substantially the same length and the remaining elevated portions are longer.

In some cases, a substantial number of grid cells 310 include a single leading edge of an elevated portion. For example, in such cases, each of at least 50%, or at least 60%, or at least 70%, or at least 80%, or at least 90%, or at least 95%, of the grid cells includes a single leading edge of an elevated portion.

In some cases, each of a small faction of grid cells 310 does not include the leading edge of an elevated portion and, instead, includes a portion of an elevated portion, where the elevated portion has a length that is greater than the average length of the elevated portions. For example, in such cases, each of less than about 40%, or less than about 30%, or less than about 25%, or less than about 20%, or less than about 15%, or less than about 10%, or less than about 5%, or less than about 4%, or less than about 3%, or less than about 2%, or less than about 1%, of grid cells 310 includes a portion of an elevated portion, where the elevated portion has a length that is greater than the average length of the elevated portions.

For ease of viewing, some of the grid cells in FIG. 3 do not include any portions of an elevated portion, but it should be understood that each of at least 70%, or at least 75%, or at least 80%, or at least 85%, or at least 90%, or at least 95%, or at least 98%, or at least 99%, of grid cells 310 in grid 320 includes either (a) a single leading edge of an elevated portion, or (b) a portion of an elevated portion, where the elevated portion has a length that is greater than the average length of the elevated portions. In some cases, each grid cell 310 in grid 320 includes at least a portion of at least one elevated portion and that each grid cell 310 includes either a single leading edge of an elevated portion, or a portion of an elevated portion, where the elevated portion has a length that is greater than the average length of the elevated portions.

Figure 4:
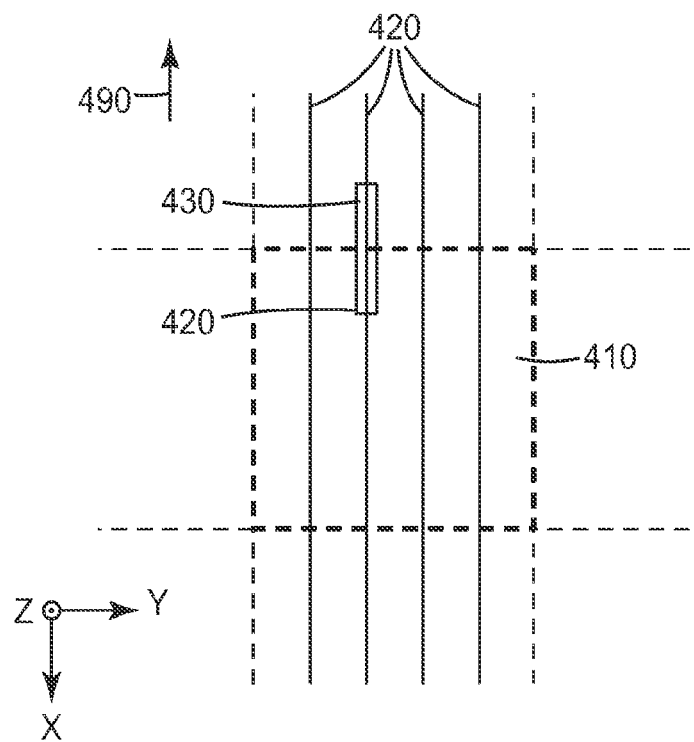
FIG. 4 is a schematic of a square grid cell.
Figure 5:
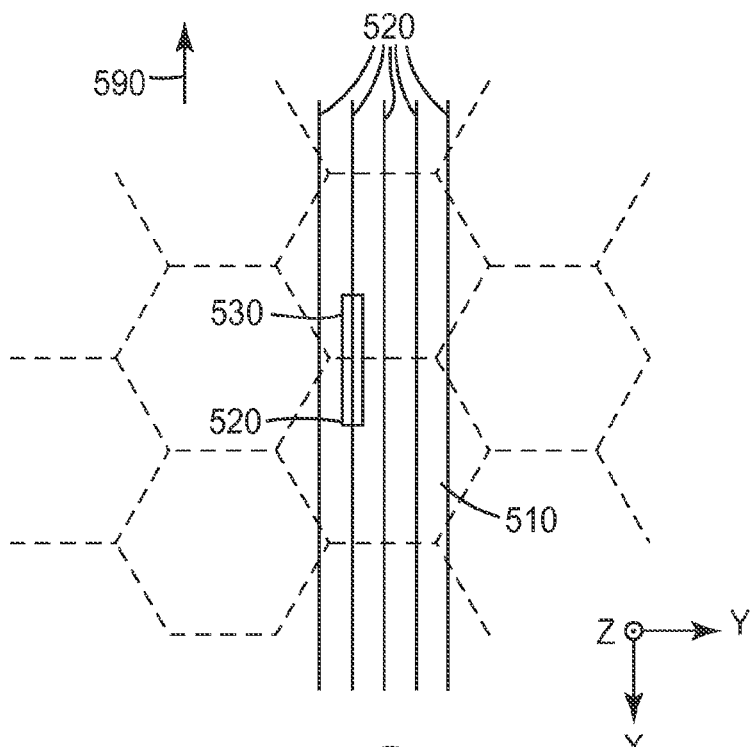
FIG. 5 is a schematic of a hexagonal grid.

Grid cells 310 have the same size and shape. The exemplary grid cells 310 are rectangular and form a continuous uniform two-dimensional grid 320 that includes vertical grid lines 325 along first direction 342 and horizontal grid lines 330 along a second direction 343 perpendicular to the first direction. In general, grid cells 310 can be in the shape of any two-dimensional rectilinear figure such as a polygon such as a pentagon or a tetragon, a trapezium, a trapezoid, a parallelogram, a rhombus, a rectangle, a deltoid, or a square. For example, FIG. 4 is a schematic top-view of a square grid cell 410 that includes four peaks 420 of four microstructures extending along a first direction 490 along the x-axis. Grid cell 410 includes a single leading edge 420 of an elevated portion 430. As another example, FIG. 5 is a schematic top-view of a hexagonal grid cell 510 that includes three peaks 520 of three microstructures extending along a first direction 590 along the x-axis. Grid cell 510 includes a single leading edge 520 of an elevated portion 530.

Figure 6:
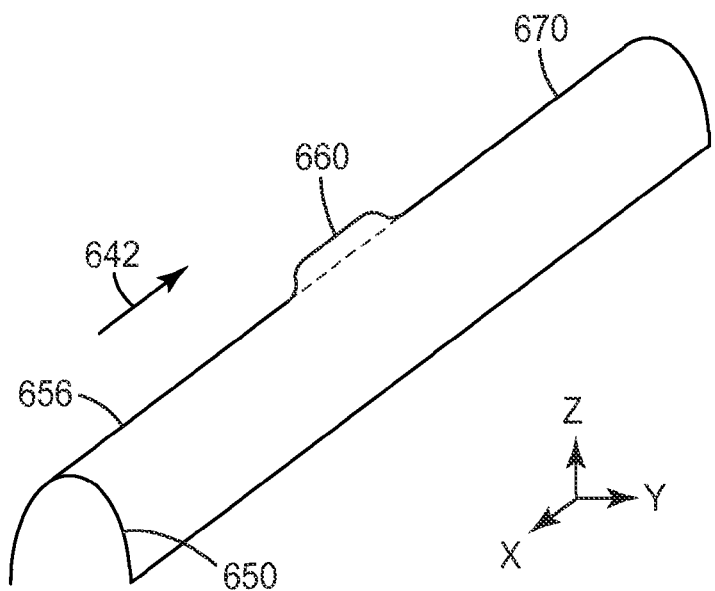
FIG. 6 is a schematic three-dimensional view of a microstructure.

Referring back to FIG. 1, the exemplary microstructures 150 have prismatic cross-sectional profiles. Each microstructure 150 includes a first side 152 and a second side 154 that meet at peak 156, a peak or apex angle 157, and a peak height 158 as measured from the peak to a common reference plane 105 disposed between first structured major surface 110 and second major surface 120. In general, microstructures 150 can have any shape that is capable of directing light and, in some cases, providing optical gain. For example, in some cases, microstructures 150 can have curvilinear cross-sectional profiles, or rectilinear cross-sectional profiles. For example, FIG. 6 is a schematic three-dimensional view of a linear microstructure 650 that has a curvilinear cross-sectional profile and extends along a first direction 642. Microstructure 650 includes a peak 656, an elevated portion 660 disposed on peak 656, and a non-elevated portion 670.

Figure 7:
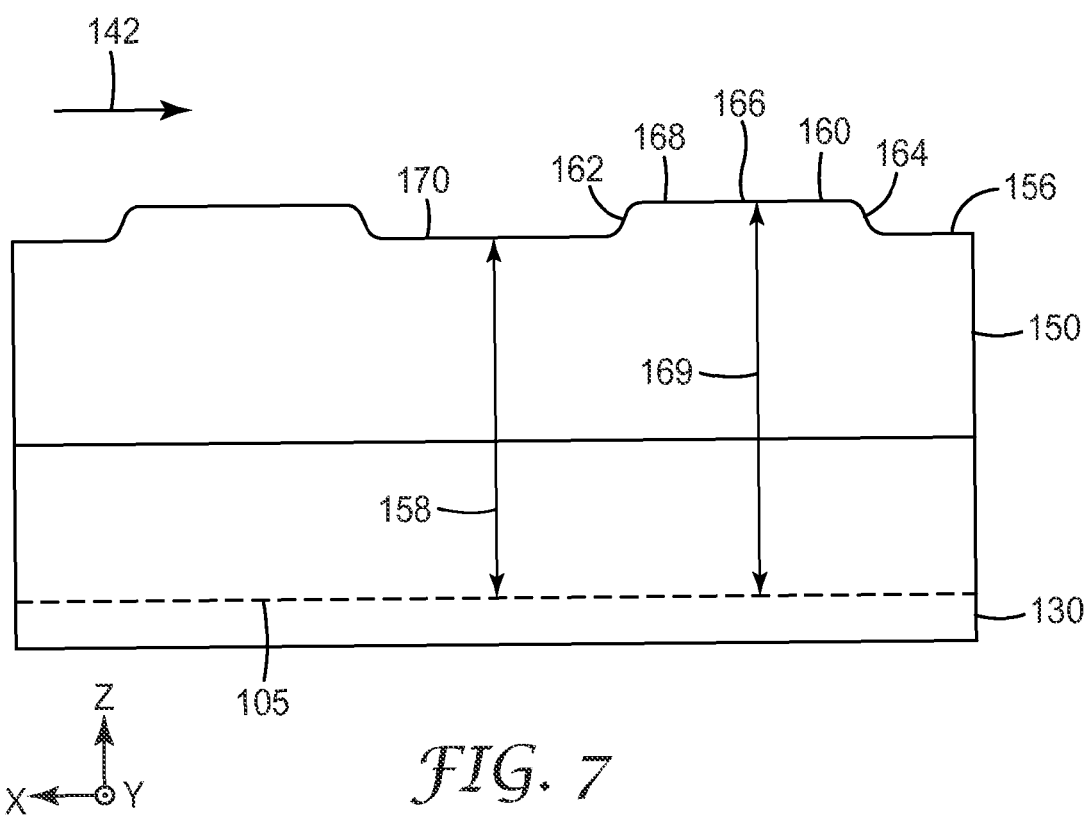
FIG. 7 is a schematic side-view of a microstructure.

Referring back to FIG. 1, elevated portions 160 of microstructures 150 have peaks 168 and peak heights 169, and non-elevated portions 170 of microstructures 150 have peaks 156 and peak heights 158, where peak heights are measured from the peaks to common reference plane 105 disposed between first structured major surface 110 and second major surface 120. As an example, the common reference plane can be second major surface 120 or a bottom major surface 144 of structured layer 140. In general, a non-elevated portion 170 can have a constant or varying peak height 158 along first direction 142. For example, in some cases, each non-elevated portion 170 has a constant peak height along the first direction. As another example, in some cases, non-elevated portions 170 of each microstructure 150 have the same constant peak height along the first direction. For example, FIG. 7 is a schematic side-view of a microstructure 150 of light directing film 100, where non-elevated portions 170 of the microstructure have the same peak height 158 along first direction 142. As yet another example, in some cases, non-elevated portions 170 of the microstructures in the plurality of microstructures 150 have the same constant peak height along the first direction.

Figure 8:
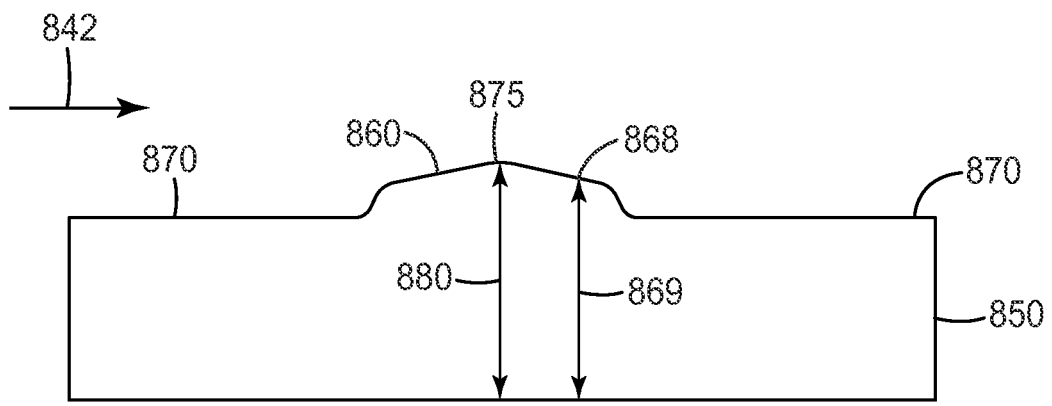
FIG. 8 is a schematic side-view of another microstructure.
Figure 9:
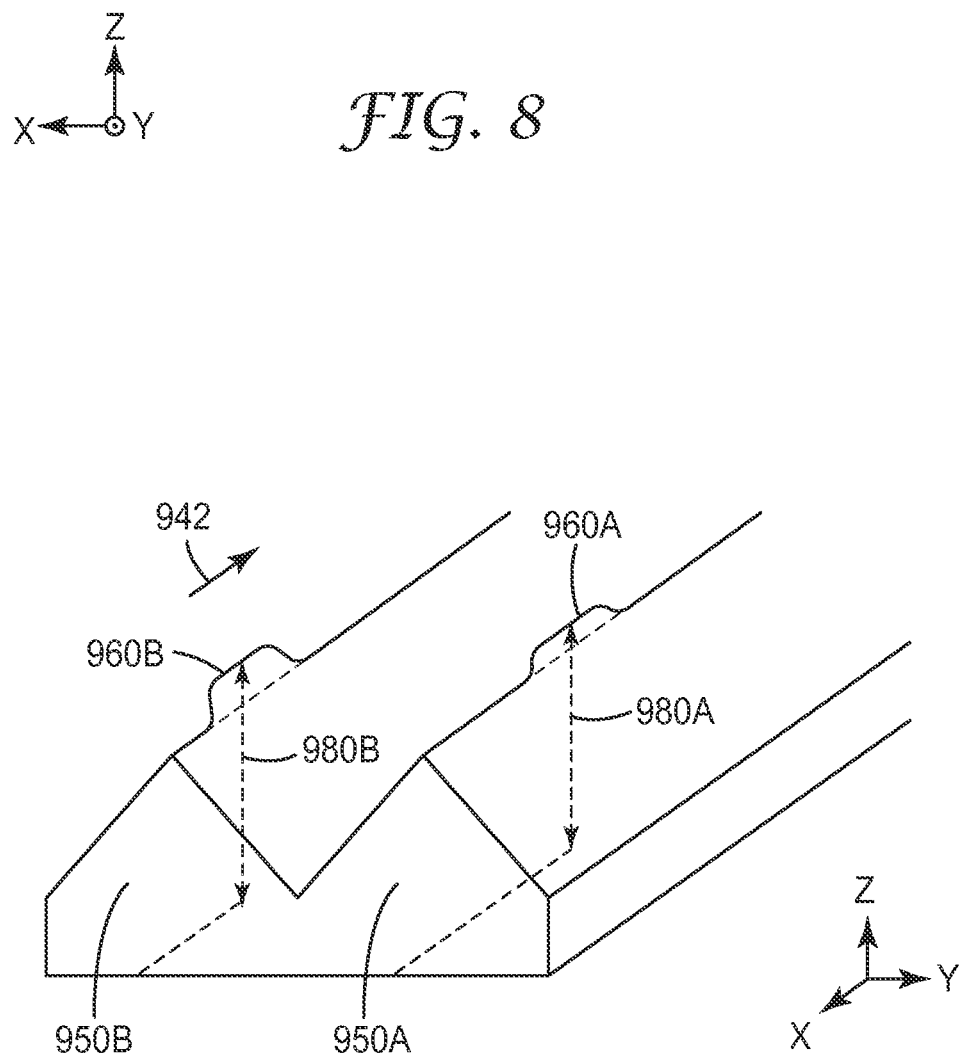
FIG. 9 is schematic three-dimensional view of two microstructures.

In general, an elevated portion 160 has a peak 168, a peak height 169, a maximum peak, and a maximum peak height. For example, FIG. 8 is a schematic side-view of a microstructure 850 that is similar to microstructures 150, extends along a first direction 842, and includes an elevated portion 860 and non-elevated portions 870. Elevated portion 860 includes a peak 868 and a peak height 869 that varies along the first direction and assumes a maximum peak height 880 at maximum peak 875. Referring back to FIG. 1, in general, elevated portions 160 of microstructures 150 may or may not have the same maximum peak height. In some cases, elevated portions 160 of the microstructures in the plurality of microstructures 150 have the same maximum peak height. In some cases, a first elevated portion has a first maximum peak height and a second elevated portion has a second maximum peak height that is different than the first maximum peak height. For example, FIG. 9 is a schematic three-dimensional view of linear microstructures 950A and 950B that extend along a first direction 942. Microstructure 950A includes an elevated portion 960A that has a maximum peak height 980A and an elevated portion 960B that has a maximum peak height 980B, where maximum peak height 980B is greater than maximum peak height 980A.

Grid cells 310 in FIG. 3 have the same size and shape and include the same number of microstructure peaks 356. In general, a grid cell can include one or more microstructure peaks, where, in some cases, the included peaks are centered in the grid cell. For example, each grid cell 310 in FIG. 3 includes two microstructure peaks 356. As another example, grid cell 410 in FIG. 4 includes four microstructure peaks 420. As yet another example, grid cell 510 in FIG. 5 includes five microstructure peaks 520. In some cases, each grid cell includes only one microstructure peak. In some cases, each grid cell includes peaks of at least two adjacent or neighboring microstructures, or at least three adjacent microstructures, or at least four adjacent microstructures, or at least five adjacent microstructures, or at least six adjacent microstructures, or at least seven adjacent microstructures, or at least eight adjacent microstructures, or at least nine adjacent microstructures, or at least ten adjacent microstructures.

Referring back to FIG. 1, structured layer 140 includes a land region 180 defined as the region between valleys 159 and bottom major surface 144 of structured layer 140. In some cases, the primary functions of the land region can include transmitting light with high efficiency, providing support for the microstructures, and providing sufficient adhesion between the microstructures and the substrate. In general, land region 180 can have any thickness that may be suitable in an application. In some cases, the thickness of land region 180 is less than about 20 microns, or less than about 15 microns, or less than about 10 microns, or less than about 8 microns, or less than about 6 microns, or less than about 5 microns. In general, structured layer 140 may or may not include a land region. In some cases, such as in the exemplary light directing film 100, structured layer 140 includes a land region. In some cases, structured layer 140 does not include a land region.

The exemplary light directing film 100 includes two layers: structured layer 140 disposed on substrate 130. In general, a disclosed light directing film can have one or more layers. For example, in some, cases, light directing film 100 can be a unitary construction and include a single layer.

In general, substrate 130 can be or include any material that may be desirable in an application. For example, substrate 130 can include or be made of glass and/or polymers such as polyethylene terapthalate (PET), polycarbonates, and acrylics. In some cases, the substrate can have multiple layers. In general, substrate 130 can provide any function that may be desirable in an application. For example, in some cases, substrate 130 may primarily provide support for the other layers. As another example, in some cases, a substrate 130 may polarize light by including, for example, a reflective or absorbing polarizer, or diffuse light by including an optical diffuser.

Figure 10:
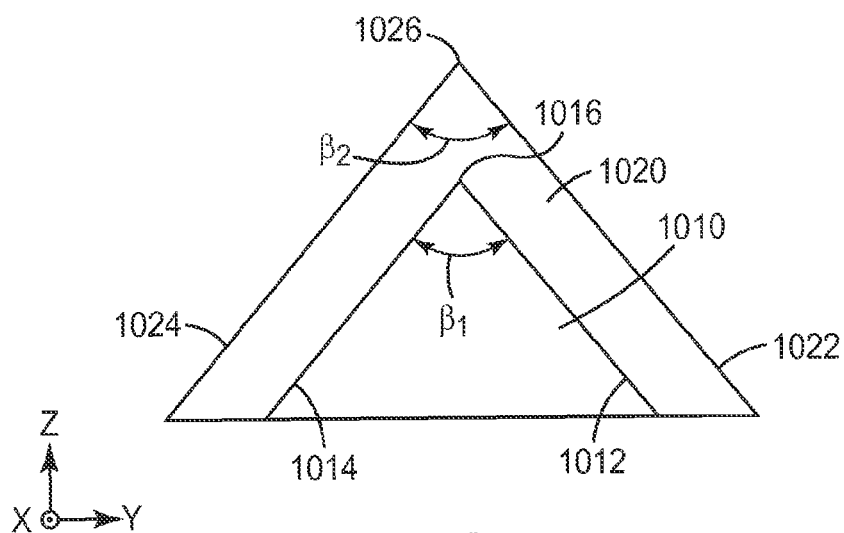
FIG. 10 is a lateral cross-section of a microstructure.

In some cases, a lateral cross-section of a disclosed microstructure in a region of an elevated portion and in a region of a non-elevated portion have the same shape as described in PCT Publication WO2009/124107 (Campbell et al.) which is incorporated herein in its entirety by reference. For example, FIG. 10 is a cross-sectional view of a microstructure similar to microstructures 150 where a lateral cross-section 1010 (cross-section in the yz-plane or in a plane perpendicular to first direction 142) in non-elevated region 170 has the same shape as a lateral cross-section 1020 in elevated region 160. Cross-section 1010 includes a first side 1012 and a second side 1014 that meet at a peak 1016 and form a peak angle $\beta_1$. Cross-section 1020 includes a first side 1022 and a second side 1024 that meet at a peak 1026 and form a peak angle $\beta_2$, where $\beta_2$ is substantially equal to $\beta_1$, first side 1022 is substantially parallel to first side 1012, and second side 1024 is substantially parallel to second side 1014.

Referring back to FIG. 1, apex, peak, or dihedral angle 157 can have any value that may be desirable in an application. For example, in some cases, apex angle 157 can be in a range from about 70 degrees to about 110 degrees, or from about 80 degrees to about 100 degrees, or from about 85 degrees to about 95 degrees. In some cases, microstructures 150 have equal apex angles which can, for example, be in a range from about 88 or 89 degree to about 92 or 91 degrees, such as 90 degrees. In general, apex or peak 156 can be sharp, rounded or flattened or truncated. For example, microstructures 150 can be rounded to a radius in a range of about 4 to 7 to 15 micrometers.

Structured layer 140 can have any index of refraction that may be desirable in an application. For example, in some cases, the index of refraction of the structured layer is in a range from about 1.4 to about 1.8, or from about 1.5 to about 1.8, or from about 1.5 to about 1.7. In some cases, the index of refraction of the structured layer is not less than about 1.5, or not less than about 1.54, or not less than about 1.55, or not less than about 1.56, or not less than about 1.57, or not less than about 1.58, or not less than about 1.59, or not less than about 1.6, or not less than about 1.61, or not less than about 1.62, or not less than about 1.63, or not less than about 1.64, or not less than about 1.65, or not less than about 1.66, or not less than about 1.67, or not less than about 1.68, or not less than about 1.69, or not less than about 1.7. In some cases, the refractive index of structured layer 140 is increased by including various brominated (meth)acrylate monomers, as described in the art. In some cases, structured layer 140 is non-brominated, meaning that the structured layer does not include bromine substituents. In such cases, however, a detectable amount, i.e. less than 1 wt-% (as measured according to Ion Chromatography) of bromine may be present as a contaminant. In some cases, the structured layer is non-halogenated. In such cases, however, a detectable amount, i.e. less than 1 wt-% (as measured according to Ion Chromatography) of halogen may be present as a contaminant.

In some cases, the refractive index of structured layer 140 is increased by including surface modified (e.g. colloidal) inorganic nanoparticles. In some cases, the total amount of surface modified inorganic nanoparticles present in structured layer 140 can be in an amount of at least 10 wt-%, or at least 20 wt-%, or at least 30 wt-%, or at least 40 wt-%. The nanoparticles can include metal oxides such as, for example, alumina, zirconia, titania, mixtures thereof, or mixed oxides thereof.

Microstructures 150 form a periodic pattern along a second direction 143 that is perpendicular to first direction 142. The periodic pattern has a pitch or period P defined as the distance between adjacent or neighboring microstructure peaks 156. In general, microstructures 150 can have any period that may be desirable in an application. In some cases, the period P is less than about 500 microns, or less than about 400 microns, or less than about 300 microns, or less than about 200 microns, or less than about 100 microns. In some cases, the pitch can be about 150 microns, or about 100 microns, or about 50 microns, or about 24 microns, or about 23 microns, or about 22 microns, or about 21 microns, or about 20 microns, or about 19 microns, or about 18 microns, or about 17 microns, or about 16 microns, or about 15 microns, or about 14 microns, or about 13 microns, or about 12 microns, or about 11 microns, or about 10 microns.

The light directing films disclosed herein have a uniform appearance and when employed in a display, such as a liquid crystal display, result in bright and uniform displayed images. The light directing films disclosed herein, such as light directing film 100, can be fabricated by first fabricating a cutting tool, such as a diamond cutting tool. The cutting tool can then be used to create the desired microstructures in a microreplication tool. The microreplication tool can then be used to microreplicate the structures into a material or resin, such as a UV or thermally curable resin, resulting in a light directing film. The microreplication can be achieved by any suitable manufacturing method, such as UV cast and cure, extrusion, injection molding, embossing, or other known methods.

Some of the advantages of the disclosed light directing films are further illustrated by the following examples. The particular materials, amounts and dimensions recited in this example, as well as other conditions and details, should not be construed to unduly limit the present invention.

EXAMPLE 1

Figure 11:
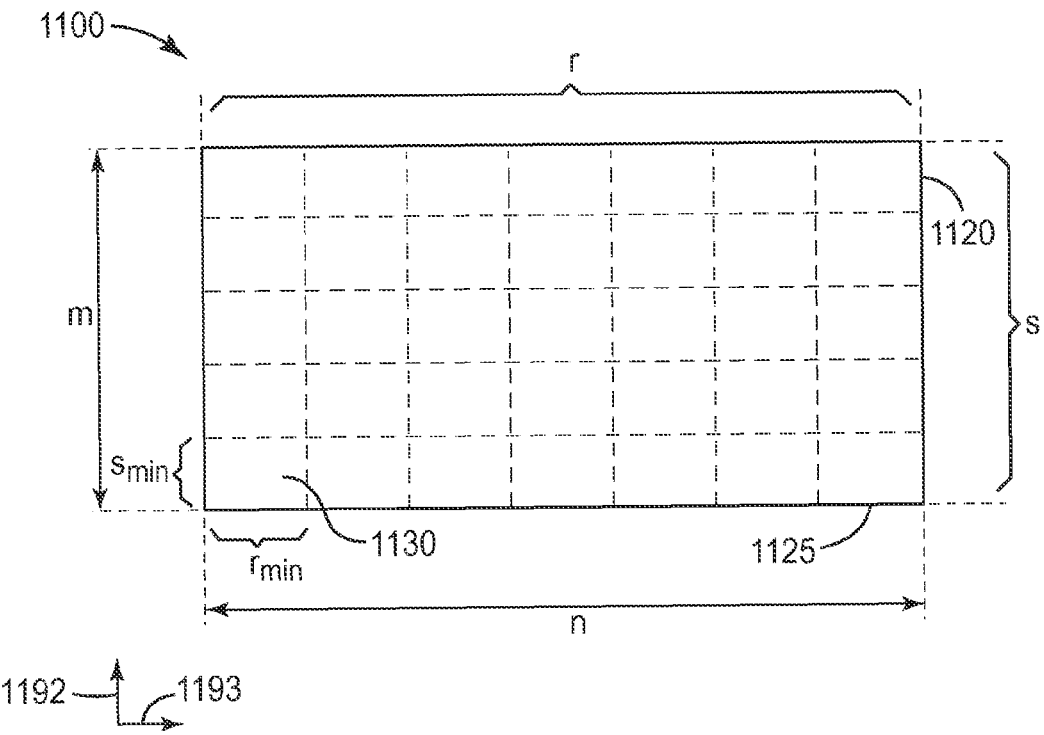
FIG. 11 is a schematic view of a grid cell.

A continuous two-dimensional grid, similar to grid 320 in FIG. 3, was designed. The grid cells were rectangular and were of the same size. FIG. 11 is a schematic view of one such grid cell 1100 having sides 1120 along a first direction 1192 along the x-axis and sides 1125 along a second direction 1193 perpendicular to the first direction and along the y-axis. The linear microstructures extended along first direction 1192 and had a period P along second direction 1193. Each grid cell 1100 included at least one microstructure peak and at least a portion of an elevated portion. Each elevated portion was to have a prescribed length L, although, in some cases, elevated portions were allowed to overlap resulting in an elevated portion having a greater length than the prescribed length L. The resulting pattern of the elevated portions was made uniform by requiring each grid cell to include preferably a single leading edge of an elevated portion, and when such an arrangement was not obtainable after a few iterations or trials, the grid cell was allowed to instead include a portion of an elevated portion, where the elevated portion had a length that was greater than the average length of the elevated portions, or the prescribed length L.

In general, the resulting pattern of the elevated portions can be made substantially uniform by requiring each of at least 70%, or at least 75%, or at least 80%, or at least 85%, or at least 90%, or at least 92%, or at least 94%, or at least 95%, or at least 96%, or at least 98%, or at least 99%, of the grid cells to include either (a) a single leading edge of an elevated portion, or (b) a portion of an elevated portion where the elevated portion has a length that is greater than the average length of the elevated portions.

The density of the elevated portions was D resulting in an area per elevated portion A of 1/D. Side 1120 of grid cell 1100 had a dimension s and side 1125 of the grid cell had a dimension r. Area A was set equal to r·s to meet, or come close to meeting, the goal of having a single leading edge of an elevated portion per grid cell. To reduce moiré effects, r was required to be an integer multiple of period P according to the following relationship:

$$r = n \cdot P \qquad (1)$$

where n was an integer. Each grid cell 1100 included at least one microstructure peak and all the grid cells included the same number of microstructure peaks. The minimum value for r, $r_{min}$, was obtained by setting n=1 in equation (1) resulting in the following expression:

$$r_{min} = P \qquad (2)$$

Hence, expression (2) could be rewritten as:

$$r = n \cdot r_{min} \qquad (3)$$

The designed pattern was to be cut into a cylindrical tool by employing a thread cut lathe turning process. The cylindrical tool had a circumference C. To obtain a seamless patterned tool, dimension s was related to C according to the following expression:

$$s = C/k \qquad (4)$$

where k was an integer. The encoding cutting process allowed for a finite number of encoder steps M. The minimum value $s_{min}$ for s was achieved when k was equal to M, resulting in the following expression:

$$s_{min} = C/M \qquad (5)$$

Hence, grid cell length s along the first direction was given by the following expression:

$$s = m \cdot s_{min} \qquad (6)$$

where m was an integer.

Minimum dimensions $r_{min}$ and $s_{min}$ defined a sub-cell 1130 resulting in grid cell 1100 having an array of sub-cells 1130 with m sub-cells along first direction 1192 and n sub-cells along second direction 1193 with the product m.n satisfying the following relationship:

$$m \cdot n = \frac{A}{\left(\frac{C}{M}\right) \cdot P} \quad (7)$$

Integer parameters m and n where chosen so that the product m·n substantially satisfied expression (7).

Each grid cell included a single leading edge. In some cases, the overlapping of two or more elevated portions masked the leading edge in a grid cell resulting in the grid cell having a portion of an elevated portion that was longer than the prescribed length.

Figure 12:
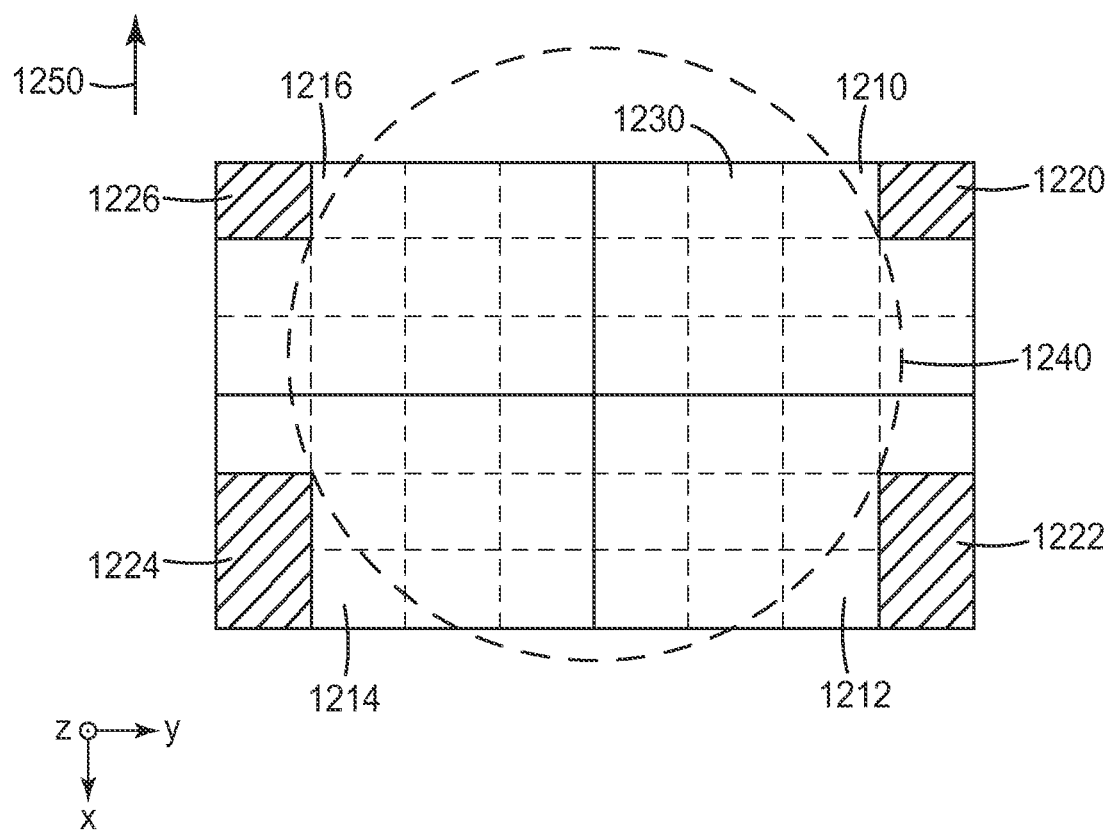
FIG. 12 is a schematic view of four neighboring grid cells.

The requirement of a single leading edge per grid cell reduces the size of the maximum circle that can be overlaid on the structured major surface of the light directing film without including a portion of an elevated portion. The expression for the diameter G of such a circle can be determined in reference to the grid cells schematically shown in FIG. 12. In particular, FIG. 12 is a schematic view of four neighboring grid cells 1210, 1212, 1214 and 1216 where each grid cell includes an exemplary array of 12 sub-cells 1230 forming three rows and four columns. Each grid cell includes a single leading edge. In particular, grid cell 1210 includes the leading edge of a portion of an elevated portion 1220, grid cell 1212 includes the leading edge of an elevated portion 1222, grid cell 1214 includes the leading edge of an elevated portion 1224, and grid cell 1216 includes the leading edge of a portion of an elevated portion 1226, where the elevated portions are assumed to be two sub-cells long and are so arranged to be farthest from one another allowing for a largest circle 1240 to be overlaid on the grid without including a portion of an elevated portion. It can be shown that the diameter G of largest circle 1240 is given by:

$$G = \left(\frac{2}{\sqrt{D}}\right)\left[\alpha \cdot \text{Max}\left(0, 1 - \frac{1}{2}\sqrt{\frac{D}{\alpha}}(L+u)\right)^2 + \frac{1}{\alpha}\left(\text{Max}(0, 1 - P\sqrt{\alpha D})\right)^2\right]^{1/2} \quad (8)$$

where L is the prescribed length of the elevated portions and is related to D and F according to the following expression:

$$L = \frac{F}{P \cdot D} \quad (9)$$

where F is the fraction of area covered by the elevated portions and is given by:

$$F = \frac{t}{n \cdot m} \quad (10)$$

where t is the prescribed length of the elevated portions in terms of the number of sub-cells along a first direction 1250. α is, in general, a ratio of a largest dimension of a grid cell along first direction 1192 to a largest dimension of the grid cell along second direction 1193 perpendicular to the first direction. For example, in the case of a rectangular grid cell, α is the ratio of the length of the rectangle to the width of the rectangle. As another example, in the case of a square grid cell, α is one.

Referring back to FIG. 1, light directing film 100 includes first structured major surface 110 that includes a plurality of microstructures 150 that extend along first direction 142, and a plurality of elevated portions 160 disposed on the plurality of microstructures. The number density (that is, the number of elevated portions per unit area) of elevated portions 160 across the light directing film is D. Each elevated portion includes leading edge 162, trailing edge 164, and main portion 166 along the first direction. Light directing film 100 can be divided into a plurality of same size and shape grid cells, such as grid cells 310, that form a continuous two-dimensional grid, such as grid 320. The area A of each grid cell 310 is approximately 1/D, meaning that the difference between A and 1/D is less than about 20%, or less than about 15%, or less than about 10%, or less than about 5%. Each of at least 70%, or at least 75%, or at least 80%, or at least 85%, or at least 90%, or at least 92%, or at least 94%, or at least 95%, or at least 96%, or at least 98%, or at least 99%, of grid cells 310 includes a single leading edge of an elevated portion.

EXAMPLE 2

A light directing film, similar to light directing film 100 in FIG. 1, was designed based on the grid designed in Example 1. The light directing film had a pitch P of 24 microns and a prismatic lateral profile with a 90 degree apex angle. The cylindrical tool had a circumference C of about 1277 mm (16 inches in diameter). The encoder had 18000 encoder steps per revolution of the cylindrical tool. The density of the elevated portions was chosen to be 2670 cm$^{-2}$ resulting in an area A per elevated portion of about 0.0374 mm$^2$. Rounding off equation (7) resulted in a product m·n of 22. Table I lists calculated values of t, F, D and G as a function of exemplary values for m and n.

TABLE I t, F, D and G parameters calculated for different combinations of m and n

| m | n | m · n | t | F | D (cm$^{-2}$) | G (mm) |
|---|---|-------|---|------|------|-------|
| 2 | 11 | 22 | 4 | 0.18 | 2670 | 0.480 |
| 3 | 8 | 24 | 4 | 0.17 | 2448 | 0.343 |
| 3 | 7 | 21 | 4 | 0.19 | 2797 | 0.297 |
| 4 | 5 | 20 | 4 | 0.20 | 2937 | 0.287 |
| 4 | 6 | 24 | 4 | 0.17 | 2448 | 0.321 |
| 5 | 4 | 20 | 4 | 0.20 | 2937 | 0.383 |
| 5 | 5 | 25 | 4 | 0.16 | 2350 | 0.403 |
| 6 | 3 | 18 | 4 | 0.22 | 3264 | 0.506 |
| 6 | 4 | 24 | 4 | 0.17 | 2448 | 0.517 |
| 8 | 3 | 24 | 4 | 0.17 | 2448 | 0.786 |

The values of 3 for m and 8 for n were chosen resulting in grid cell 1100 having 8 sub-cells (n=8) along second direction 1193 and 3 sub-cells (m=3) along first direction 1192. The grid cell dimensions were about 0.213 mm along first direction 1192 and about 0.192 mm along second direction 1193. $r_{min}$ was 24 microns and $s_{min}$ was about 70.9 microns. The prescribed length of each elevated portion was 4 sub-cells long, or about 283.7 microns, along first direction 1192. The diameter G of the largest circle was 0.343 mm.

Each grid cell included a single leading edge of an elevated portion. For each grid cell, the location of the leading edge coincided with a sub-cell of the grid cell, where the sub-cell was chosen randomly. In the event of an overlap between a newly located elevated portion and a previously located elevated portion, or if the spacing between the newly located elevated portion and the previously located portion was less than a pre-determined number of sub-cells, the location of the newly located elevated portion was randomly changed to avoid overlap, or to avoid violating the minimum spacing requirement. However, if the elevated portions continued to overlap, or be spaced apart less than the pre-determined distance, after a finite number of iterations, the location of the newly located elevated portion was fixed resulting in an elevated portion that was longer than the prescribed length.

Figure 13:
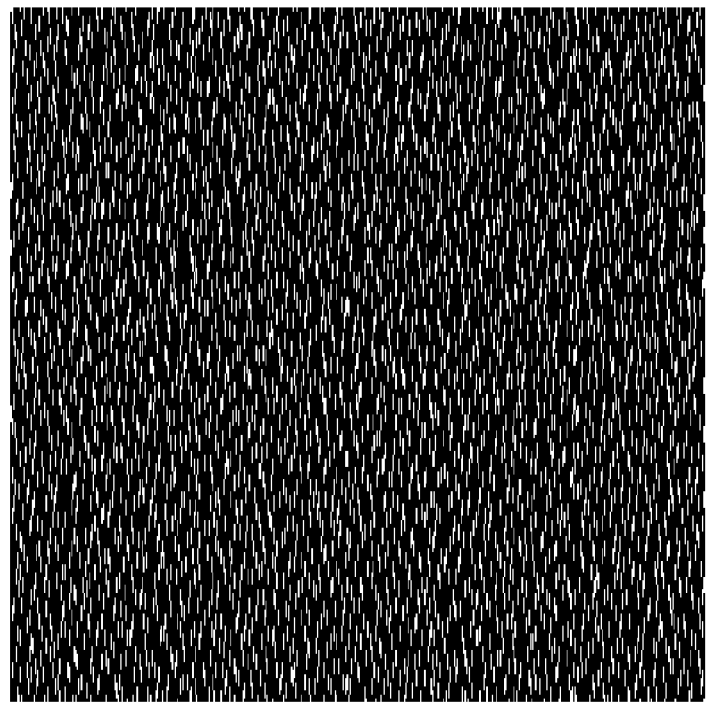
FIG. 13 is a top-view of a plurality of elevated portions.
Figure 14:
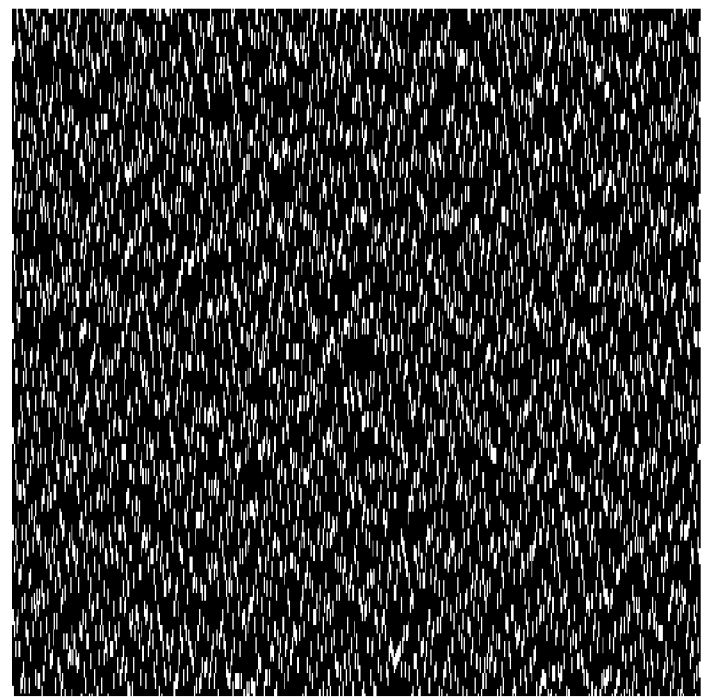
FIG. 14 is a top-view of another plurality of elevated portions.

FIG. 13 is a top-view of a computer simulation of the placement of the elevated portions in the grid cells as described in Examples 1 and 2. Each white line is an elevated portion disposed on the peak of a prism. The imaged area is about 12 mm×12 mm. FIG. 14 is a top-view of the elevated portions placed randomly along the peaks of the prisms and without the requirement of having a single leading edge of an elevated portion in each grid cell of a grid. The imaged area in FIG. 14 is about 12 mm×12 mm. Comparing FIGS. 13 and 14, it is clear that the elevated portions arranged in FIG. 13 according to the invention have a substantially more uniform appearance. Furthermore, the elevated portions in FIG. 13 did not result in, or resulted in very little, additional visible and objectionable moiré interference even though the placement of the elevated portions was not as random as in FIG. 14.

EXAMPLE 3

A light directing film, similar to light directing film 100 and based on the design of Example 2 was made. A microreplication tool was made using the processes outlined and described in, for example, U.S. Patent Publication No. 2009/0041553, the disclosure of which is incorporated in its entirety herein by reference thereto. The microreplication tool was then used to make light directing film using the processes outlined and described in, for example, U.S. Pat. No. 5,175,030, the disclosure of which is incorporated in its entirety herein by reference thereto. The light directing film included a structured layer, similar to structured layer 140 disposed on a substrate similar to substrate 130. The substrate was made of PET, had a thickness of about 50 microns, and an index of refraction of about 1.65. The apex angle of each prism 3930 was about 90 degrees. The lateral cross-section of the microstructures in regions of elevated portions and in regions of non-elevated portions had the same shape. The prisms had a pitch P of about 24 microns. The index of refraction of the linear prisms was about 1.65. The linear prisms included polymerized organic components and surface modified inorganic zirconia nanoparticles. The diameter G of the largest circle that could be overlaid on the structured major surface of the light directing film without including a portion of an elevated portion was about 0.34 mm. The optical gain of a single sheet of the light directing film was measured to be about 1.78, where optical gain refers to the ratio of the luminance of an optical system, such as a display system, with the film in place in the optical system to the luminance of the optical system without the film in place. In the light directing films disclosed herein, the diameter of the largest circle that can be overlaid on the structured major surface of the light directing film without including at least a portion of an elevated portion is not greater than about 0.5 mm, or not greater than about 0.45 mm, or not greater than about 0.4 mm, or not greater than about 0.35 mm.

Figure 15:
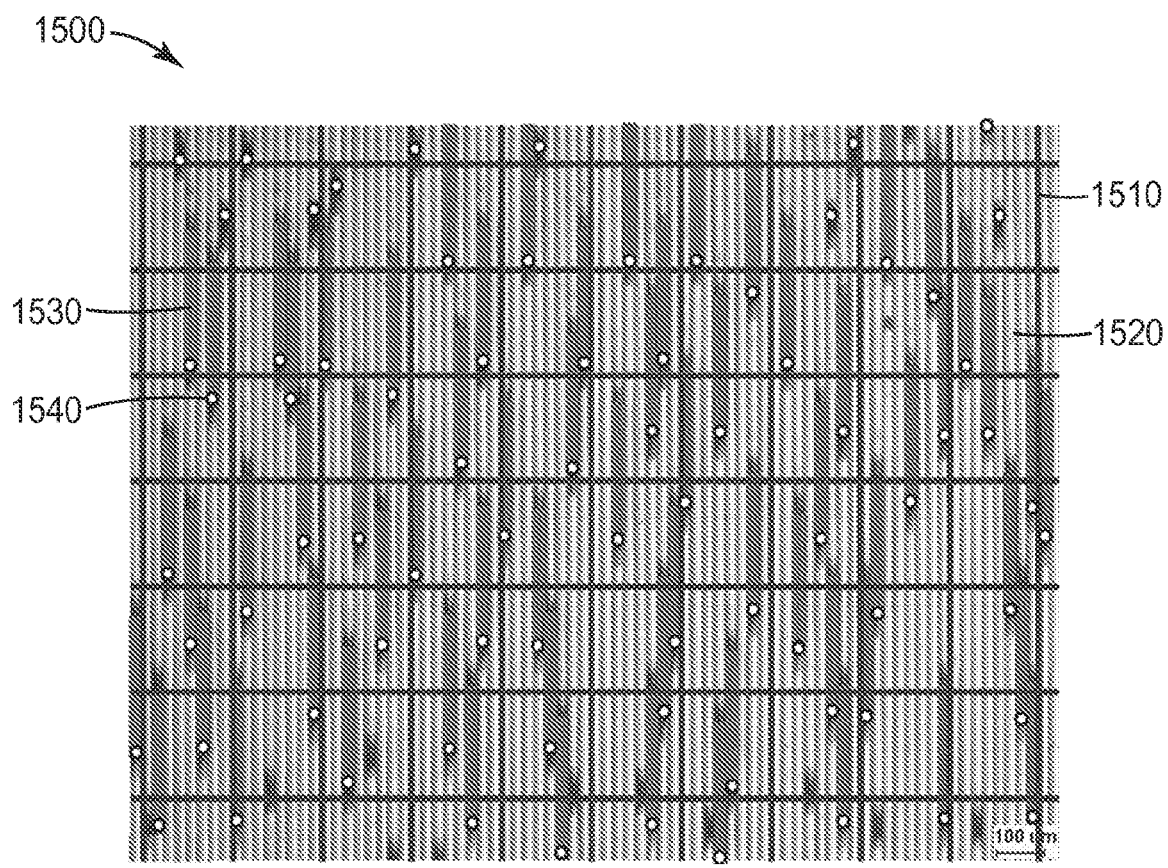
FIG. 15 is a top-view optical micrograph of a light directing film.
Figure 16A:
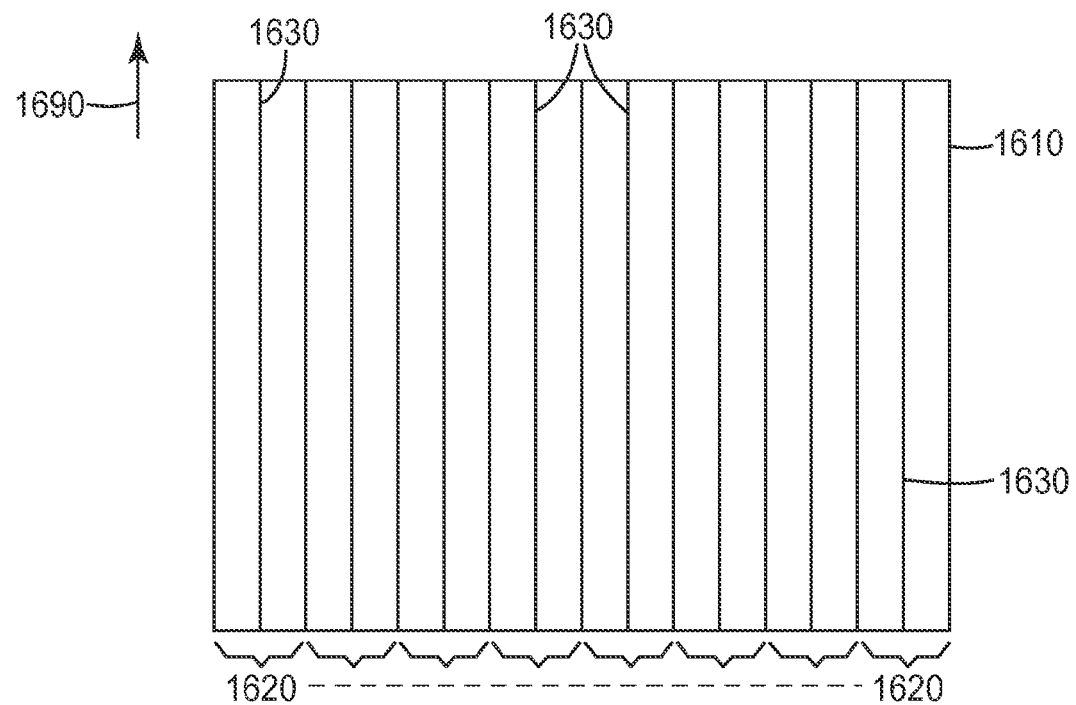
FIG. 16A-16D are schematic representations of various stages or steps in a method of distributing a plurality of protrusions on a light directing film.
Figure 16B:
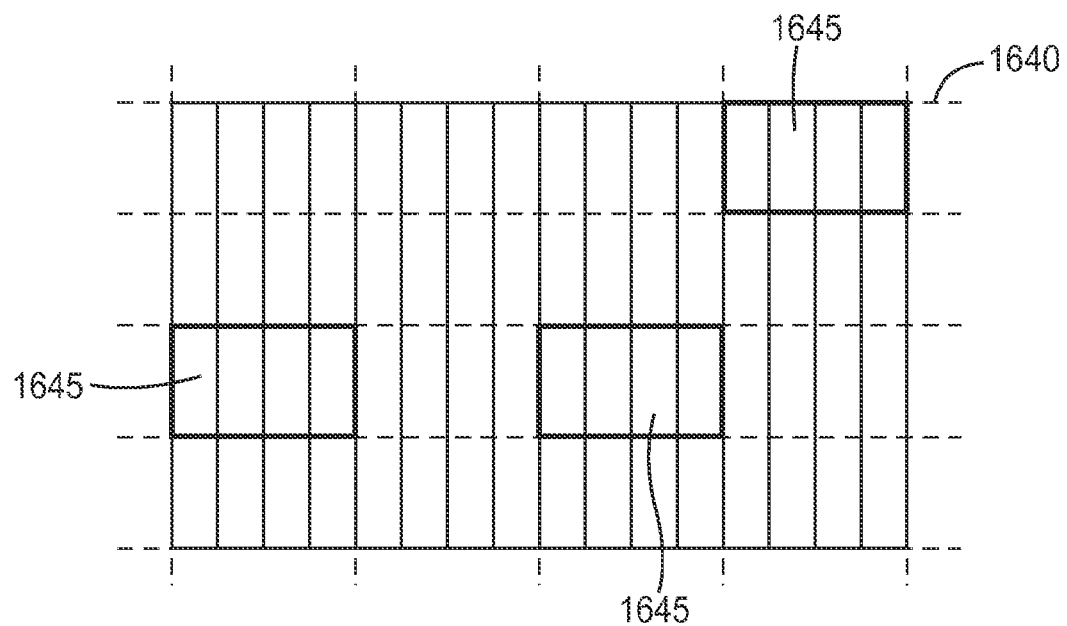
Figure 16C:
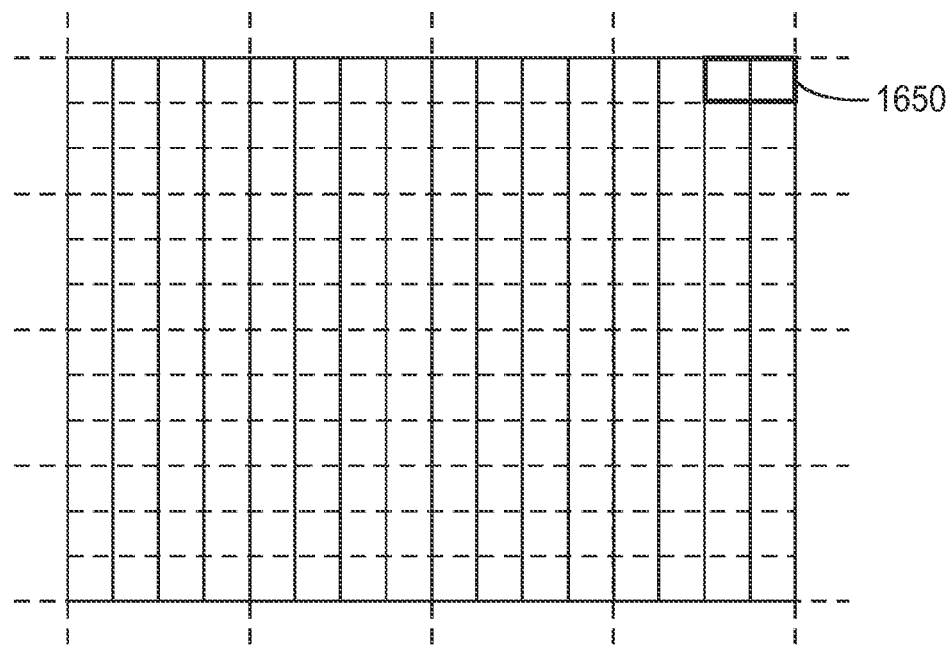
Figure 16D:
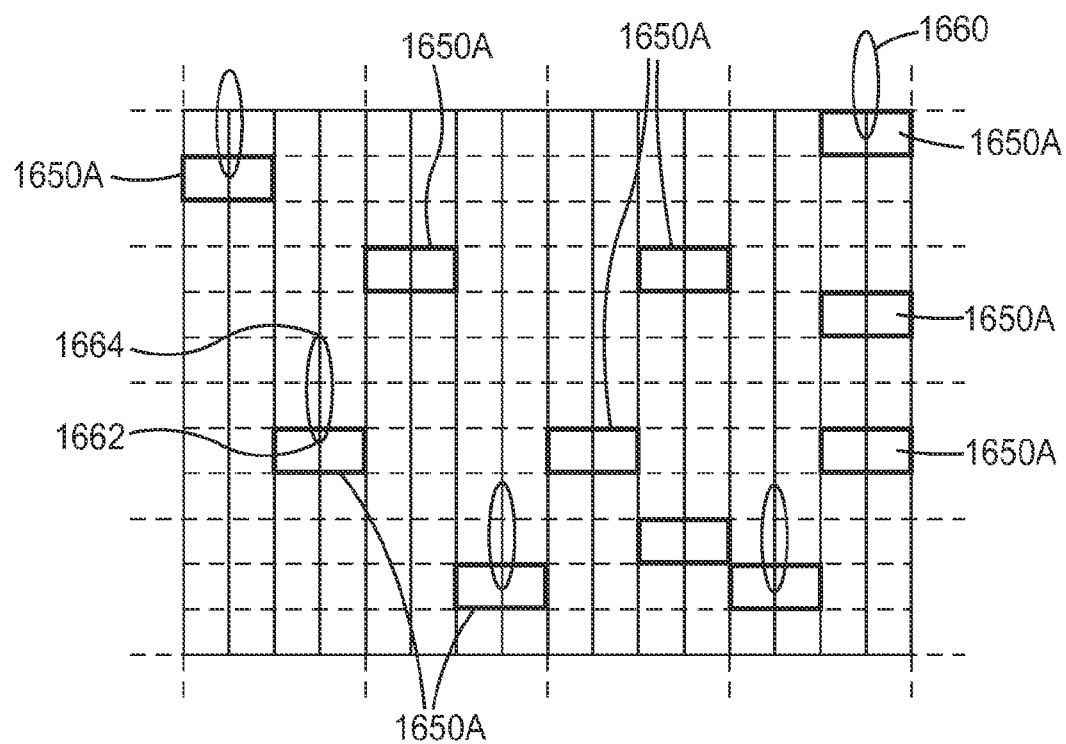

FIG. 15 is a top-view optical micrograph of the light directing film. In the optical micrograph and merely for ease of viewing, elevated portions 1530 were enhanced to appear as darker gray regions. A small circle 1540 at the bottom of each elevated portion indicates the leading edge of the elevated portion. A continuous uniform two-dimensional grid 1510 having a plurality of grid cells 1520 was overlaid on the light directing film. Each grid cell included at least a portion of an elevated portion and only one leading edge of an elevated portion. The light directing film had a uniform appearance and when placed in a liquid crystal display, resulted in bright and uniform displayed images.

In some example disclosed herein, each grid cell includes either a single leading edge of an elevated portion, or a portion of an elevated portion where the elevated portion has a length that is greater than the average length of the elevated portions. In general, each of at least 70%, or at least 75%, or at least 80%, or at least 85%, or at least 90%, or at least 92%, or at least 94%, or at least 95%, or at least 96%, or at least 98%, or at least 99%, of the grid cells, or each grid cell, includes either (a) a single leading edge of an elevated portion, or (b) a portion of an elevated portion, where the elevated portion has a length that is greater than the average length of the elevated portions.

FIG. 16 describes a method of distributing a plurality of protrusions 1660 on a light directing film so that the resulting light directing film has a uniform appearance. The light directing film can be similar to light directing film 100 without elevated portions 160 and the protrusions can be similar to elevated portions 160. First, a light directing film 1610 is provided, a top-view of which is schematically shown in FIG. 16A. The light directing film includes a plurality of microstructures 1620 that extend along a first direction 1690. Each microstructure 1620 includes a peak 1630 that extends along first direction 1690. Next, a continuous grid 1640 is overlaid on the light directing film as schematically illustrated in FIG. 16B. The grid includes a plurality of same size and shape grid cells 1645. Each grid cell includes the same number of microstructure peaks 1630. For example, in the exemplary grid 1640, each grid cell 1645 includes two microstructure peaks. Next, each grid cell 1645 is divided into the same number of sub-cells 1650 as illustrated schematically in FIG. 16C. Each sub-cell 1650 includes a single microstructure peak 1630. Next, a single sub-cell is chosen in each grid cell. Some of the chosen sub-cells are highlighted as sub-cells 1650A in FIG. 16D. For ease of viewing, not all chosen sub-cells are highlighted. In some cases, each chosen sub-cell is randomly chosen amongs the sub-cells in a grid cell. Next, a leading edge 1662 of protrusion 1660 is placed in each chosen sub-cell, such that leading edges 1662 of protrusions 1660 are on the same side of the protrusions and trailing edges 1664 of the protrusions are on the opposite side of the protrusions.

As used herein, terms such as "vertical", "horizontal", "above", "below", "top", "bottom" "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 1 is flipped as compared to the orientation in the figure, surface 144 is still considered to be the bottom surface.

Item 1. A light directing film comprising a structured major surface comprising a plurality of microstructures extending along a first direction, each microstructure comprising a plurality of elevated portions and a plurality of non-elevated portions, the elevated portions of the plurality of microstructures having an average length, each elevated portion comprising a leading edge and a trailing edge along the first direction, wherein the light directing film can be divided into a plurality of same size and shape grid cells forming a continuous two-dimensional grid, each of at least 90% of the grid cells comprising either a single leading edge of an elevated portion, or a portion of an elevated portion where the elevated portion has a length that is greater than the average length of the elevated portions.

Item 2. The light directing film of item 1, wherein each of at least 92% of the grid cells comprises either a single leading edge of an elevated portion, or a portion of an elevated portion where the elevated portion has a length that is greater than the average length of the elevated portions.

Item 3. The light directing film of item 1, wherein each of at least 94% of the grid cells comprises either a single leading edge of an elevated portion, or a portion of an elevated portion where the elevated portion has a length that is greater than the average length of the elevated portions.

Item 4. The light directing film of item 1, wherein each of at least 96% of the grid cells comprises either a single leading edge of an elevated portion, or a portion of an elevated portion where the elevated portion has a length that is greater than the average length of the elevated portions.

Item 5. The light directing film of item 1, wherein each of at least 98% of the grid cells comprises either a single leading edge of an elevated portion, or a portion of an elevated portion where the elevated portion has a length that is greater than the average length of the elevated portions.

Item 6. The light directing film of item 1, wherein each grid cell comprises either a single leading edge of an elevated portion, or a portion of an elevated portion where the elevated portion has a length that is greater than the average length of the elevated portions.

Item 7. The light directing film of item 1, wherein at least some of the microstructures have prismatic cross-sectional profiles.

Item 8. The light directing film of item 1, wherein at least some of the microstructures have curvilinear cross-sectional profiles.

Item 9. The light directing film of item 1, wherein at least some of the microstructures have rectilinear cross-sectional profiles.

Item 10. The light directing film of item 1, wherein the non-elevated portions of each microstructure have a same constant peak height along the first direction.

Item 11. The light directing film of item 1, wherein the non-elevated portions of the microstructures in the plurality of microstructures have a same constant peak height along the first direction.

Item 12. The light directing film of item 1, wherein the elevated portions of the microstructures in the plurality of microstructures have a same maximum peak height.

Item 13. The light directing film of item 1, wherein a first elevated portion has a first maximum peak height and a second elevated portion has a second maximum peak height different than the first maximum peak height.

Item 14. The light directing film of item 1, wherein the grid cells are rectangular.

Item 15. The light directing film of item 1, wherein the grid cells are square.

Item 16. The light directing film of item 1, wherein each grid cell includes only one microstructure peak.

Item 17. The light directing film of item 1, wherein each grid cell includes peaks of at least two adjacent microstructures.

Item 18. The light directing film of item 1, wherein each grid cell includes peaks of at least three adjacent microstructures.

Item 19. The light directing film of item 1, wherein a lateral cross-section of a microstructure in a region of an elevated portion and in a region of a non-elevated portion have the same shape.

Item 20. The light directing film of item 1, wherein each of at least 50% of the grid cells comprises a single leading edge of an elevated portion.

Item 21. The light directing film of item 1, wherein each of at least 70% of the grid cells comprises a single leading edge of an elevated portion.

Item 22. The light directing film of item 1, wherein each of at least 90% of the grid cells comprises a single leading edge of an elevated portion.

Item 23. The light directing film of item 1, wherein each of less than about 20% of the grid cells does not include a leading edge of an elevated portion and includes a portion of an elevated portion, the elevated portion having a length that is greater than the average length of the elevated portions.

Item 24. The light directing film of item 1, wherein each of less than about 10% of the grid cells does not include a leading edge of an elevated portion and includes a portion of an elevated portion, the elevated portion having a length that is greater than the average length of the elevated portions.

Item 25. The light directing film of item 1, wherein each of less than about 5% of the grid cells does not include a leading edge of an elevated portion and includes a portion of an elevated portion, the elevated portion having a length that is greater than the average length of the elevated portions.

Item 26. The light directing film of item 1, wherein at least 50% of the elevated portions have substantially a same length.

Item 27. The light directing film of item 1, wherein at least 70% of the elevated portions have substantially a same length.

Item 28. The light directing film of item 1, wherein at least 90% of the elevated portions have substantially a same length.

Item 29. The light directing film of any of items 26-28, wherein the remaining elevated portions have longer lengths.

Item 30. The light directing film of item 1, wherein the elevated portions of each microstructure cover at least about 1.5% of the microstructure along the first direction.

Item 31. The light directing film of item 1, wherein the elevated portions of each microstructure cover at least about 3% of the microstructure along the first direction.

Item 32. The light directing film of item 1, wherein the elevated portions of each microstructure cover at least about 5% of the microstructure along the first direction.

Item 33. The light directing film of item 1, wherein the elevated portions of each microstructure cover at least about 10% of the microstructure along the first direction.

Item 34. A light directing film comprising a structured major surface comprising a plurality of microstructures extending along a first direction and a plurality of elevated portions disposed on the plurality of microstructures, a number density of the elevated portions across the light directing film being D, each elevated portion comprising a leading edge and a trailing edge along the first direction, wherein the light directing film can be divided into a plurality of same size and shape grid cells forming a continuous two-dimensional grid, an area of each grid cell being approximately 1/D, wherein each of at least 90% of the grid cells comprises a single leading edge of an elevated portion.

Item 35. The light directing film of item 34, wherein each of at least 92% of the grid cells comprises a single leading edge of an elevated portion.

Item 36. The light directing film of item 34, wherein each of at least 94% of the grid cells comprises a single leading edge of an elevated portion.

Item 37. The light directing film of item 34, wherein each of at least 96% of the grid cells comprises a single leading edge of an elevated portion.

Item 38. A light directing film comprising a structured major surface comprising a plurality of microstructures extending along a first direction, each microstructure comprising a plurality of elevated portions and a plurality of non-elevated portions, a lateral cross-section of a microstructure in a region of an elevated portion and in a region of a non-elevated portion having a same shape, wherein a diameter of a largest circle that can be overlaid on the structured major surface of the light directing film without including at least a portion of an elevated portion is not greater than about 0.5 mm.

Item 39. The light directing film of item 38, wherein the diameter of the largest circle that can be overlaid on the structured major surface of the light directing film without including at least a portion of an elevated portion is not greater than about 0.45 mm.

Item 40. The light directing film of item 38, wherein the diameter of the largest circle that can be overlaid on the structured major surface of the light directing film without including at least a portion of an elevated portion is not greater than about 0.4 mm.

Item 41. The light directing film of item 38, wherein the diameter of the largest circle that can be overlaid on the structured major surface of the light directing film without including at least a portion of an elevated portion is not greater than about 0.35 mm.

Item 42. The light directing film of item 38, wherein at least some of the non-elevated portions have constant heights.

Item 43. A light directing film comprising a structured major surface comprising a plurality of microstructures extending along a first direction, each microstructure comprising a plurality of elevated portions and a plurality of non-elevated portions, the elevated portions of the plurality of microstructures having an average length, each elevated portion comprising a leading edge and a trailing edge along the first direction, wherein the light directing film can be divided into a plurality of same size and shape grid cells forming a continuous two-dimensional grid, each grid cell comprising peaks of at least two neighboring microstructures, each of at least 70% of the grid cells comprising either a single leading edge of an elevated portion, or a portion of an elevated portion where the elevated portion has a length that is greater than the average length of the elevated portions.

Item 44. A method of distributing a plurality of protrusions on a light directing film, the method comprising the steps of:

(a) providing a light directing film comprising a plurality of microstructures extending along a first direction, each microstructure comprising a peak extending along the first direction;

(b) overlaying a continuous grid on the light directing film, the grid comprising a plurality of same size and shape grid cells, such that each grid cell includes a same number of microstructure peaks;

(c) dividing each grid cell into a same number of sub-cells such that each sub-cell comprises a single microstructure peak;

(d) choosing a single sub-cell in each grid cell; and (e) placing a leading edge of a protrusion in each randomly chosen sub-cell.

Item 45. The method of item 44, wherein each protrusion comprises a trailing edge opposite the leading edge of the protrusion, and wherein carrying out step (e) results in the leading edges of the protrusions being on a same side of the protrusions and the trailing edges of the protrusions being on an opposite side of the protrusions.

Item 46. The method of item 44, wherein step (d) comprises randomly choosing a single sub-cell in each grid cell.

Item 47. The method of item 44, wherein steps (a) through (e) are carried out sequentially.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A light directing film comprising a structured major surface comprising a plurality of microstructures extending along a first direction, each microstructure comprising a plurality of elevated portions and a plurality of non-elevated portions, the elevated portions of the plurality of microstructures having an average length, each elevated portion comprising a leading edge and a trailing edge along the first direction, wherein the light directing film can be divided into a plurality of same size and shape grid cells forming a continuous two-dimensional grid, each of at least 90% of the grid cells comprising either a single leading edge of an elevated portion, or a portion of an elevated portion where the elevated portion has a length that is greater than the average length of the elevated portions.

2. The light directing film of claim 1, wherein each grid cell comprises either a single leading edge of an elevated portion, or a portion of an elevated portion where the elevated portion has a length that is greater than the average length of the elevated portions.

3. The light directing film of claim 1, wherein at least some of the microstructures have prismatic cross-sectional profiles.

4. The light directing film of claim 1, wherein at least some of the microstructures have curvilinear cross-sectional profiles.

5. The light directing film of claim 1, wherein at least some of the microstructures have rectilinear cross-sectional profiles.

6. The light directing film of claim 1, wherein the non-elevated portions of the microstructures in the plurality of microstructures have a same constant peak height along the first direction.

7. The light directing film of claim 1, wherein the elevated portions of the microstructures in the plurality of microstructures have a same maximum peak height.

8. The light directing film of claim 1, wherein the grid cells are rectangular.

9. The light directing film of claim 1, wherein the grid cells are square.

10. The light directing film of claim 1, wherein each grid cell includes only one microstructure peak.

11. The light directing film of claim 1, wherein each grid cell includes peaks of at least three adjacent microstructures.

12. The light directing film of claim 1, wherein each of at least 90% of the grid cells comprises a single leading edge of an elevated portion.

13. The light directing film of claim 1, wherein each of less than about 20% of the grid cells does not include a leading edge of an elevated portion and includes a portion of an elevated portion, the elevated portion having a length that is greater than the average length of the elevated portions.

14. The light directing film of claim 1, wherein at least 90% of the elevated portions have substantially a same length.

15. The light directing film of claim 1, wherein the elevated portions of each microstructure cover at least about 10% of the microstructure along the first direction.

16. A light directing film comprising a structured major surface comprising a plurality of microstructures extending along a first direction, each microstructure comprising a plurality of elevated portions and a plurality of non-elevated portions, a lateral cross-section of a microstructure in a region of an elevated portion and in a region of a non-elevated portion having a same shape, wherein a diameter of a largest circle that can be overlaid on the structured major surface of the light directing film without including at least a portion of an elevated portion is not greater than about 0.5 mm.

17. A method of distributing a plurality of protrusions on a light directing film, the method comprising the steps of:
  (a) providing a light directing film comprising a plurality of microstructures extending along a first direction, each microstructure comprising a peak extending along the first direction;
  (b) overlaying a continuous grid on the light directing film, the grid comprising a plurality of same size and shape grid cells, such that each grid cell includes a same number of microstructure peaks;
  (c) dividing each grid cell into a same number of sub-cells such that each sub-cell comprises a single microstructure peak;
  (d) randomly choosing a single sub-cell in each grid cell; and
  (e) placing a leading edge of a protrusion on the single microstructure peak in each randomly chosen sub-cell.

18. The method of claim 17, wherein each protrusion comprises a trailing edge opposite the leading edge of the protrusion, and wherein carrying out step (e) results in the leading edges of the protrusions being on a same side of the protrusions and the trailing edges of the protrusions being on an opposite side of the protrusions.

19. The method of claim 17, wherein steps (a) through (e) are carried out sequentially.

* * * * *